United States Patent [19]

Minh

[11] Patent Number: 5,058,942

[45] Date of Patent: Oct. 22, 1991

[54] PERMANENT SUNSHIELDS FULLY COVER AUTOMOBILE WINDOWS

[76] Inventor: Do L. Minh, 17231 Regulus Dr., Yorba Linda, Calif. 92686

[21] Appl. No.: 574,395

[22] Filed: Aug. 27, 1990

Related U.S. Application Data

[63] Continuation of Ser. No. 413,166, Sep. 27, 1989, abandoned.

[51] Int. Cl.$^5$ ............................................. B60J 3/02
[52] U.S. Cl. .................................. 296/97.4; 296/97.6; 296/97.12
[58] Field of Search .................. 296/97.1, 97.3, 97.4, 296/97.6, 97.7, 97.9, 97.12, 97.13; 160/DIG. 3

[56] References Cited

U.S. PATENT DOCUMENTS

| | | |
|---|---|---|
| 2,112,726 | 3/1938 | Kemp et al. ........................ 296/97.6 |
| 2,220,429 | 11/1940 | Soderberg ................. 160/DIG. 3 X |
| 2,673,118 | 3/1954 | Phelps ...................... 296/97.6 X |
| 2,681,824 | 6/1954 | Knoblock ...................... 296/97.9 |
| 3,244,447 | 4/1966 | Whitaker ................... 296/97.12 X |
| 4,202,396 | 5/1980 | Levy .................................. 160/107 |
| 4,248,474 | 2/1981 | Mandrick ......................... 296/97.6 |
| 4,332,414 | 6/1982 | Surtin ................................. 296/97.7 |
| 4,526,415 | 7/1985 | Jardine ............................. 296/97.6 |
| 4,635,995 | 1/1987 | Mineck ............................. 296/97.6 |
| 4,652,038 | 3/1987 | Aunger ............................. 296/152 |
| 4,681,363 | 7/1987 | Hemmeke et al. ............ 296/97.6 X |
| 4,746,162 | 5/1988 | Maness ............................... 296/152 |
| 4,792,177 | 12/1988 | Svensson ........................... 296/152 |
| 4,801,170 | 1/1989 | Moore ....................... 160/DIG. 3 X |
| 4,815,784 | 3/1989 | Zheng ............................... 296/97.7 |
| 4,824,161 | 4/1989 | Lee .............................. 296/97.12 X |
| 4,929,014 | 5/1990 | Clark et al. ...................... 296/97.8 |

FOREIGN PATENT DOCUMENTS

| | | | |
|---|---|---|---|
| 2249780 | 4/1974 | Fed. Rep. of Germany ... | 296/97.12 |
| 2932102 | 2/1981 | Fed. Rep. of Germany ..... | 296/97.9 |
| 2310894 | 12/1976 | France ................................ | 296/97.6 |
| 598409 | 9/1959 | Italy .................................... | 296/97.9 |

Primary Examiner—Margaret A. Focarino
Assistant Examiner—Andrew C. Pike

[57] ABSTRACT

A sunshield comprises a panel which, in its storage position, is supported under the roof of the vehicle at a height above the passenger's head by a rod. In this storaage position, the rod points to a direction perpendicular to the window. To move it to its operative position inside the window, the panel is rotated from its horizontal to vertical position, while the rod itself is rotated to a direction generally horizontal and generally parallel to the window. The inside surface of the sunshield always faces toward the interior of the automobile.

8 Claims, 6 Drawing Sheets

PERMANENT SUNSHIELDS FULLY COVER AUTOMOBILE WINDOWS

This is a continuation of copending application Ser. No. 07/413,166 filed on Sept. 27, 1989, abandoned.

BACKGROUND OF THE INVENTION

1. Field of the invention

The present invention relates to sunshields, and specifically to automobile sunshields for blocking sun rays and inhibiting heat transfer through the window of a parked automobile.

2. Description of Prior Art

The problem of temperature build up inside a car parked in the sun is well recognized. Not only that this causes extreme discomfort to the driver and passengers upon their returning, it also adds more load to the air conditioner and destroys the plastic, fabric, and other materials within the vehicle.

Numerous vehicular sunshields have been introduced into the market to solve this problem. Broadly speaking, they fall into two main categories: out-door and in-door. The out-door devices include a cover to cover the entire car. This is very bulky and using it is very time-consuming and awkward. It is therefore less preferable to those in-door means such as curtains or venetian blinds or folding cardboard.

The design of an indoor sunshield, hereafter referred to simply as sunshield, must take into consideration at least the following problems:

(1) Storage: If the sunshield is not fixed permanently in the car, when not in use, it must be compact for storage; if it is, then it must be stored in a suitable position unobstructive to the normal usage of the car when not in use.

(2) Coverage: In use against the window, the sunshield must cover it as much as possible, leaving no "holes" so that sun rays can pass through.

(3) Ease of positioning: The driver must be able to position the sunshield against the window with ease. Ideally, the movement of the sunshield from its storage position to its operative position against the window must be fixed so that an electrical device can be installed to move it back and forth between these positions upon the turn of a switch.

(4) Insulation: The sunshield must be made of suitable material to reflect the sunlight and to prevent heat transfer to inside the car.

(5) Economy: Not only that the sunshield must not be too expensive to produce, it must last for a long time, preferably for the lifetime of the vehicle.

(6) Appearance: The sunshield must be pleasant looking, blending nicely with the design and color of the car. It cannot distort material printed on it, making it hard to read.

Prior art sunshields have not been able to address all these problems satisfactorily. As an example, let us consider U.S. Pat. No. 4,202,396 to A. Levy (1980), which is currently the most successful commercially. It is made of cardboard, folded in an accordion fashion. In folded mode, it is too bulky for storage. In operative mode, it does not conform to the contour of the window, thus is unable to cover it completely. Positioning it to the window is not a simple task. It is relatively cheap, because it uses cheap material. This, however, results in inferior heat resistance and, coupled with the drying effect of the elevated temperature and the constant folding between the joint sections, in rapid deterioration. Even when it is new, its folded surface makes messages or designs printed on it hard to read; when it is old and torn, it is unsightly. Other type of sunshields include those fan-like venetian blinds as shown in Surtin, U.S. Pat. No. 4,332,414 (1982). These sunshields cannot cover the window enough to make it effective. Sunshields using curtains might be able to cover the window better, but are too complicated to operate.

It is therefore highly desirable to provide a sunshield which can address all these above problems satisfactorily.

SUMMARY OF THE INVENTION

It is an object of the present invention to provide an automobile sunshield which can be fixed permanently in a car and stored in a position unobstructive to the normal usage of the car when not in use.

It is also an object of the present invention to provide an automobile sunshield which can be very easily installed inside a car.

It is also an object of the present invention to provide an automobile sunshield which can be integrated in the car during its manufacturing process, freeing the user's time and effort to buy and install it in their cars later.

It is also an object of the present invention to provide an automobile sunshield which can cover a car's window almost completely.

It is also an object of the present invention to provide an automobile sunshield which can be positioned against the car's window, including its windshield, with ease. Its movements from its storage position to its operative position against the window and vice versa are fixed so that an electrical device can be installed to move it back and forth between these positions upon the turn of a switch.

It is also an object of the present invention to provide an automobile sunshield which uses efficient heat reflecting material.

It is also an object of the present invention to provide an automobile sunshield which is not too expensive to produce, and can last for the lifetime of the vehicle.

It is also an object of the present invention to provide an automobile sunshield which does not distort any material printed on it, is pleasant looking, and blends nicely with the design and color of the car.

Features of the invention useful in accomplishing the above objectives include a panel shaped and sized to fit inside a window of a vehicle. The panel is fixed to the car by the rod of the sun visor and, in turn, provides means so that the sun visor can be attached to it. In its operative mode, it is positioned immediately inside the window of the car; in its non-operative mode, it is stored under the roof of the car, at a height above the passenger's head. Its movements back and forth between these two positions are simple, comprising of simultaneous swinging about two axes.

The foregoing and other objects of the present invention as well as the present invention itself and its embodiments may be more fully understood from the following description when read in conjunction with the accompanying drawings.

DESCRIPTION OF THE PREFERRED EMBODIMENTS

While the present invention is described mainly in terms of a sunshield for windshield, it should be noted that the present invention can be utilized for all the vehicle's windows, including the windshield, and the side and rear windows, in a similar fashion. The description is limited to the windshield, especially on the driver's side of the windshield, because of the unique problem associated therewith.

Figure 1:
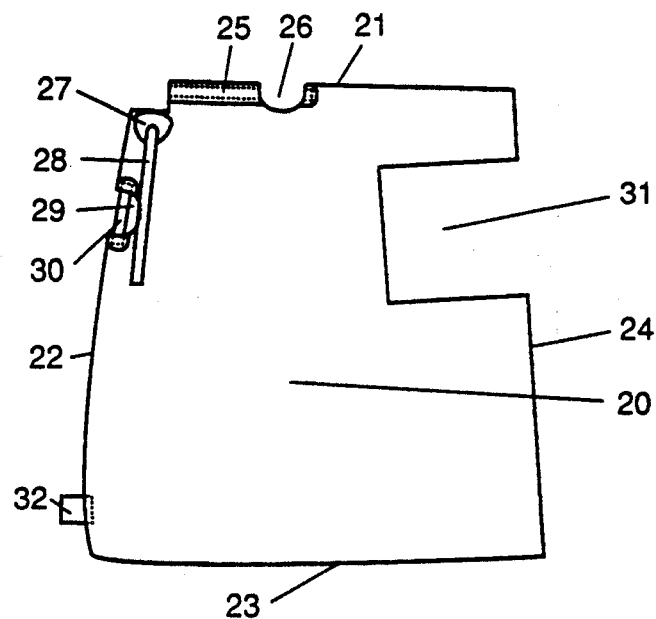
FIG. 1 represents a perspective view of the basic form of the sunshield.
Figure 2:
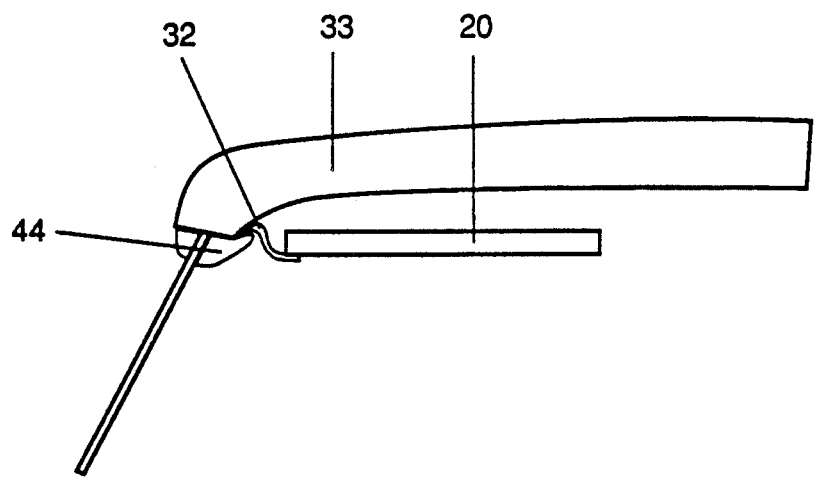
FIG. 2 represents a hook to attach the sunshield to the frame of the windshield.
Figure 5:
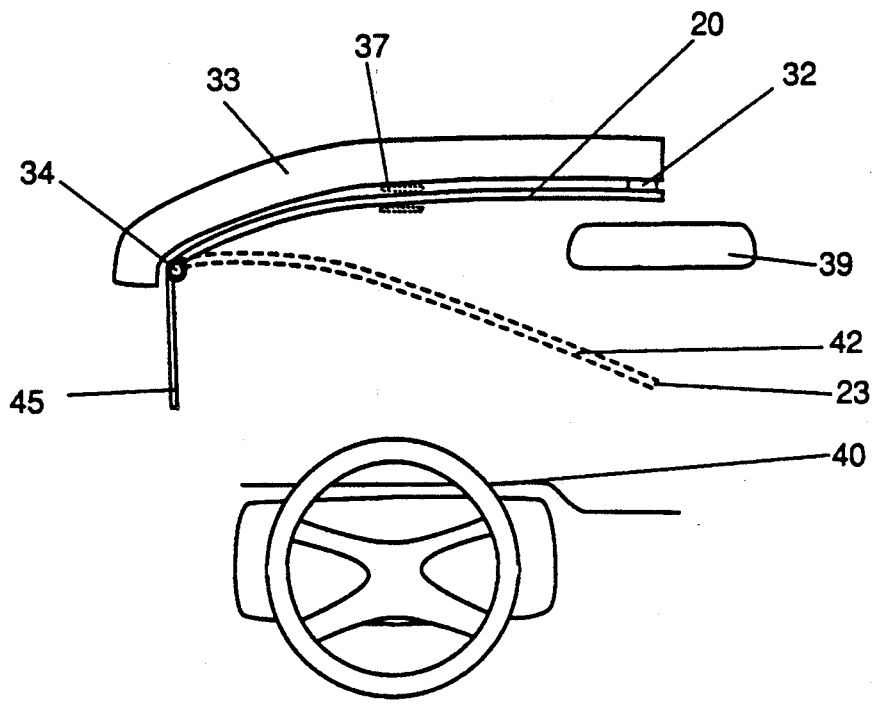
FIG. 5 represents a sectional view of the sunshield in its storage position.

Referring to FIG. 1, there is shown an automobile sunshield composed of a rigid panel 20 shaped and sized like half of the windshield with which it is to be used; especially the length of edge 22, which will hereafter be referred to as the "height" of the panel, is approximately the same as the height of the windshield, which is the distance between its top and bottom edges. At the corner of edge 21 and edge 22, along edge 21 is a hannel 25 the size of which is suitable for receiving the sun visor rod of the vehicle. If the vehicle has a clamp 37 above the windshield to clamp the sun visor rod, a small section 26 is cut out of panel 20 along channel 25 so that the rod inside can be accommodated in this clamp. Near the corner of edges 22 and 23, there is a hook 32, the shape of which is represented in FIG. 2. Along side edge 22, adjacent to channel 25, there is a swivel attachment 27 and a rod 28 the sizes and details of which are the same as those of the swivel attachment and the sun visor rod of the vehicle. If the vehicle has clamp 37 to clamp the sun visor rod, a small section 29 is cut out of panel 20 and a short rod 30 is provided so that clamp 37 can receive this rod. Along other side edge 24, there is a rectangular section 31 which is cut out from the panel, the size of which is the smallest such that the rearview mirror of the vehicle will not interfere with the operation of the sunshield. The panel is slightly curved along the general direction parallel to two edges 22 and 24 to fit against the roof 33 of the can as shown in FIG. 5.

The whole assembly is simple to produce, made of rigid, heat-reflecting material. Thus this invention meets the objective that the sunshield is heat-reflecting, not too costly to produce, and can last for the lifetime of the vehicle.

To install the sunshield, the user first pulls the sun visor from its original rod in their car. This sun visor will then be attached to the panel by engaging its channel to rod 28. The whole assembly will then be attached to the car by engaging the original sun visor rod to its channel 25.

Figure 3:
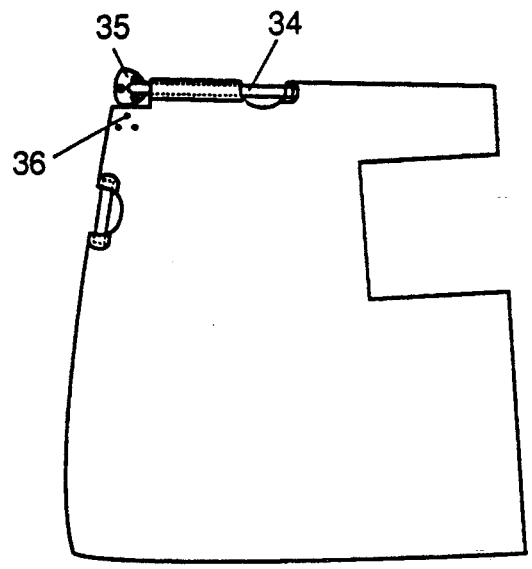
FIG. 3 represents a perspective view of another basic form of the sunshield.

If, for a particular model, the original sun visor rod is too short or too weak to support the whole assembly, then, instead of providing the assembly with swivel attachment 27 and rod 28 as shown in FIG. 1, a sunshield rod 34 with its swivel attachment 35 are provided as represented in FIG. 3. The relative positions of the screws in attachment 35 are exactly the same as those in the sun visor attachment in the car. The user first uses a screwdriver to disengage the sun visor and its attachment from the car. This sun visor and its attachment will then be attached to panel 20 using pre-drilled holes 36 in the panel. The whole sunshield assembly is now screwed to roof 33 of the car using the holes previously supporting the sun visor.

The present invention thus meets the objective of providing an automobile sunshield which is very easy to be installed inside a car.

The present invention thus also meets the objective of providing a sunshield which can be integrated in the car during its manufacturing process, freeing the user's time and effort to buy and install it later.

Figure 4:
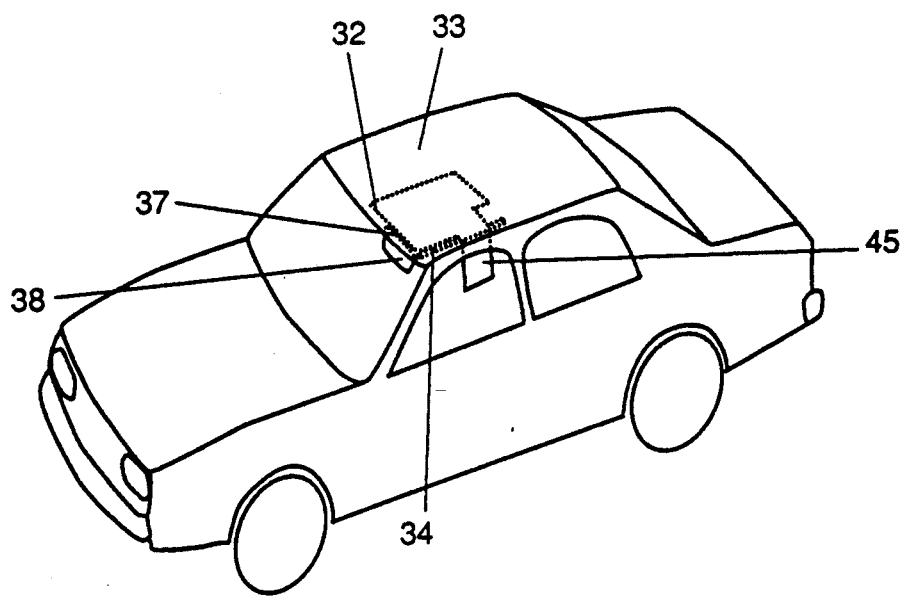
FIG. 4 represents a perspective view of the sunshield in its storage position.

The panel is stored under roof 33 as shown in FIGS. 2, 4, and 5. The whole assembly, which is very thin and light, is supported by sunshield rod 34, clamp 37, and hook 32 to hook edge 22 to the windshield frame 44 as shown in FIG. 2. Note that in this position, the sunshield rod 34 is perpendicular to the windshield and points to the back of the car and the sun visor 38 is in its intended position, or a little lower, retaining its full operating capacity. The curvature of the panel makes it conform nicely to the underside of the roof as shown in FIG. 5. The surface of the panel facing the roof of the car will hereafter be referred to as the "outside surface"; the surface on the other side the "inside surface."

Stored in this position, not only that the sunshield does not interfere with the usage of the car in any way, it also provides additional insulation to the interior of the car on extreme hot or cold days while it is driven, thus lightening the load on the air conditioner. The present invention thus meets the objective of providing an automobile sunshield which is fixed permanently in a car and stored in a position unobstructive to the normal usage of the car when not in use.

Figure 6:
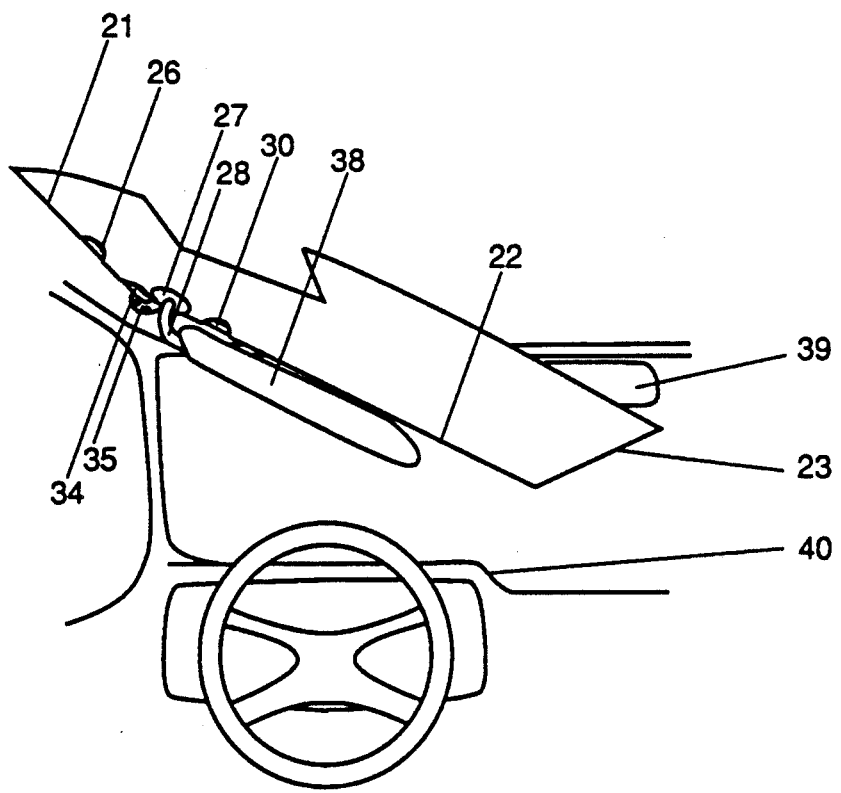
FIG. 6 represents a perspective view of the sunshield in its intermediate position approximately one-third of the way from its storage position to its operative position.
Figure 7:
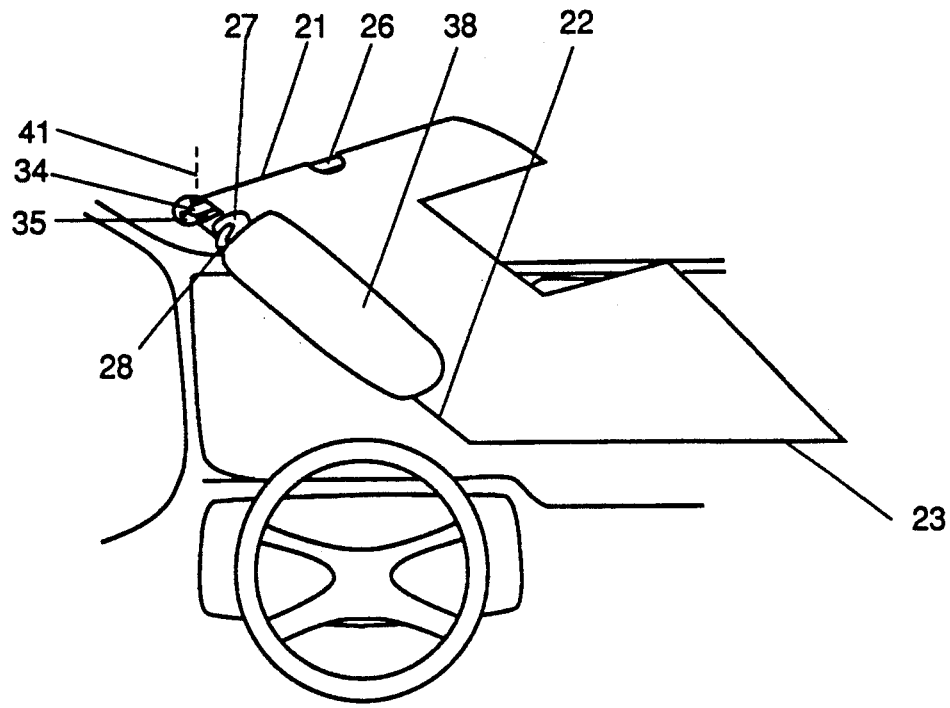
FIG. 7 represents a perspective view of the sunshield in its intermediate position approximately two-thirds of the way from its storage position to is operative position.
Figure 8:
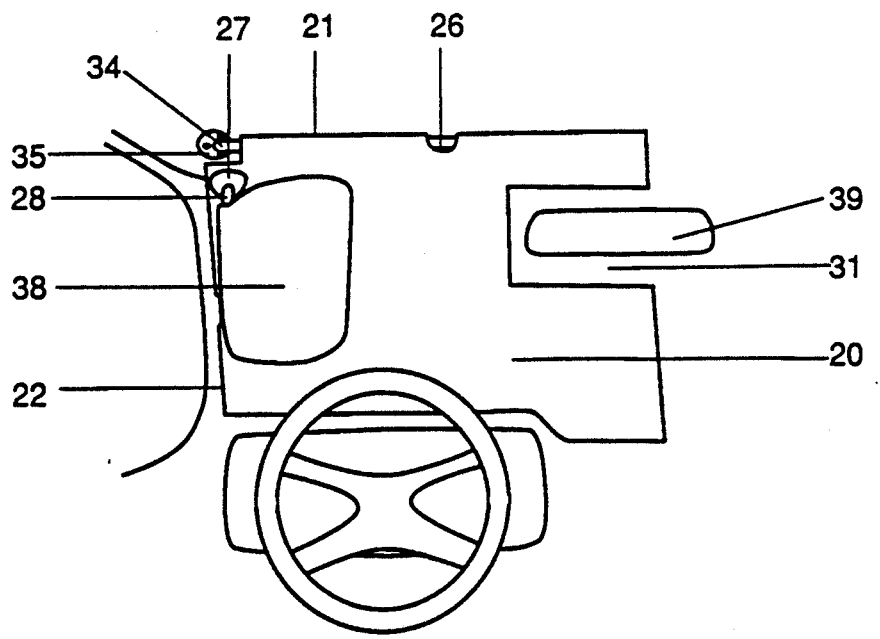
FIG. 8 represents a perspective view of the sunshield in its operative position.
Figure 9:
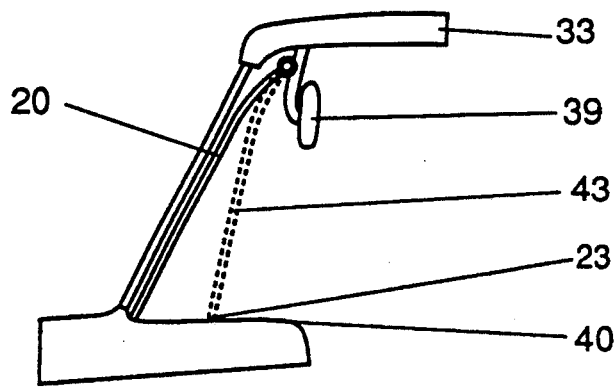
FIG. 9 represents a sectional view of the sunshield in its operative position.

To move the sunshield to its operating position, hook 32 is first disengaged and rod 30 freed from clamp 37. The sunshield is then rotated around rod 34 to position 42 so that its lower edge 23 is lower than the rearview mirror 39 but not lower than the top of the dashboard 40. FIGS. 5 and 6 represent this position in sectional and perspective views, respectively. The user then "throws it in" by swinging the sunshield around the vertical axis 41 in swivel attachment 35 while edge 23 continues to rotate around rod 34 due to gravitational force and the guidance of the windshield. FIG. 7 represents an intermediate position of this movement. The sunshield should stop by itself in its intended position as represented in FIGS. 8 and 9. If the vehicle has clamp 37, then rod 34 can be secured into this clamp, although this does not seem to be necessary. At this operating position, the inside surface of the sunshield faces toward the interior of the car, the sunshield rod 34 remains in a generally horizontal position and is parallel to the windshield.

To move the sunshield from this operative position back to its storage position, the user uses the same process in reverse.

Note that a driver with a normal height can move the panel back and forth between these two positions without having to lean too far to one side to clear for its path.

The present invention thus meets the objective of providing an automobile sunshield which can be positioned against the window with ease. Its movement from its storage position to its operative position against the window is fixed so that an electrical device can be installed to move it back and forth from these positions upon a turn of a switch.

In its operating position, the curvature of the sunshield brings it even closer to the windshield as shown in FIG. 9. Except for hole 31, which is partly covered by rearview mirror 39, the sunshield covers the driver's half of the windshield completely. Also, as described later, an additional means such as a glareshield can be incorporated to cover this hole 31 entirely. If electrical means is used to move the sunshield, then its movements are precise, and hole 31 can be made very small, just enough to let the rearview mirror pass through.

The present invention thus meets the objective of providing an automobile sunshield which can cover car's windshield almost completely.

Preferably, the sunshield is customized to conform to the different dimensions, shapes, colors, and special features of various makes of vehicles. This makes the present invention meet the objective of providing a sunshield which is pleasant looking, blends nicely with the design and color of the car, and does not distort any material printed on it.

While the requirement that the sunshield be customized to various models might cause some inconvenience to its manufacturer and distributors, it is hoped that the car manufacturers will adopt it as one of their standard or optional equipment. In this case, this requirement should not cause any additional cost and the sunshield can be better secured to its storage position. In any case, the sunshield does not have to fit the windshield exactly: panel 20 on the driver's side can overlap with that on the passenger's side and both can be a little shorter than the windshield. In the later case, in its operative position, edge 23 will stay slightly away from the windshield as represented in position 43 in FIG. 9.

Figure 10:
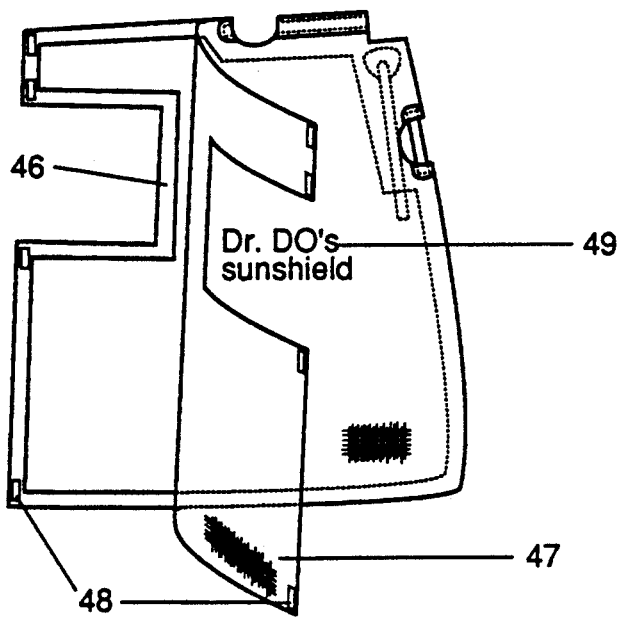
FIG. 10 represents a perspective view of the sunshield according to a preferred embodiment of the present invention in which the panel comprises a rigid frame and a sheet of material.

A preferred embodiment of this invention is shown in FIG. 10 wherein panel 20 includes a rigid frame 46 and a sunshield sheet 47. Simple means 48 are provided to attach the sheet 47 to the frame 46 to form a panel equivalent to panel 20. There are many advantages for this configuration. The first is that the sheet 47 can be made of very efficient heat-reflective fabric while the frame 46 can be made of rigid, long lasting, but not necessarily of efficient heat-reflecting material. This makes the whole assembly cheaper to produce. The second advantage is that the user now can replace messages 49 displayed on the sunshield more often. Although the whole assembly can be made to last for a long time, there are not many messages or pictures that the users would want to display for that long. With this configuration, they simply replace the sheet 47 when desired. Note that the sheet 47 can be made "universal"; i.e. independent to the shape and size of a particular vehicle and the frame 46 can be adjustable to fit inside a particular window.

Another preferred embodiment is that the panel 20 be made foldable or comprising of many sub-panels, movable within a frame. In its storage position, the sunshield can be folded to its most compact form; in its operative position, the sub-panels are rearranged to cover the entire windshield. The area of the sub-panels cannot be too small, however, as this would make its extension into its full area too complicated. A somewhat similar arrangement is found in U.S. Pat. No. 4,248,474 to Mandrick (1981) in which the whole sunshield in its most compact form has an the smaller than the sun visor and thus can be attached to the sun visor. Since such area is small, many panels are needed and extending it to cover the windshield is therefore not a simple task. In this preferred embodiment of this invention, there is no limit on the size of the sub-panels and thus an optimal size can be realized.

Figure 11:
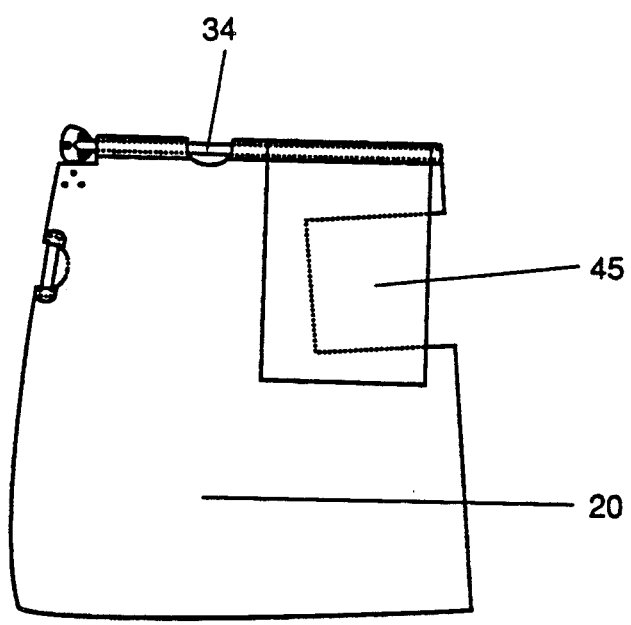
FIG. 11 represents a perspective view of the sunshield according to a preferred embodiment of the present invention which includes a glareshield.

Another preferred embodiment is shown in FIG. 11 wherein a glareshield 45 is pivotally attached to panel 20 by the elongated rod 34. While sunshields, which block sun rays completely, can only be used in a parked vehicle, glareshields, made of transparent material which transmit only a proportion of incident light, can be used when the car is driven. Prior Art glareshields include a rectangular semi-flexible transparent material mounted on a closed window as described in U.S. Pat. No. 4,746,162 to Manness (1988). FIG. 4 represents the position of the glareshield 45 in its operative position while the car is driven. Note that, while the glareshield is in its operative position, the car window can be open and the driver does not have to swing the sun visor to the window when the car changes its direction from west to north in the evening. Furthermore, when the sunshield is in its operative position, the glareshield 45 covers part of hole 31 left around the rearview mirror 39.

As indicated, the present invention is not only applicable to the windshield but also to all the car's windows, including the windshield, and the side and rear windows. The general principle here is that the sunshield, in its storage position, is supported by a rod which is attached to the roof of the vehicle and points to the direction perpendicular to the window. To move to its operative position, the sunshield is rotated around this rod from its horizontal to its vertical position, while the rod itself is rotated to a direction generally horizontal and generally parallel to the window. The inside surface of the sunshield always faces toward the interior of the automobile.

While the principles of the invention have now been made clear in the illustrated embodiments, there will be obvious to those skilled in the art many modifications of structure, arrangements, proportions, elements, materials, and components used in the practice of the invention, without departing from those principles. The appended claims are therefore intended to cover and embrace such modifications within the limits only of the true spirit and scope of the invention.

I claim as my invention:

1. A sunshield, for an automobile having a front windshield, comprising:
   a generally rigid panel having an outside surface and an inside surface;
   attachment means for attaching said panel adjacent said windshield and within a passenger interior of the automobile; and pivot means for pivoting said panel into a first position and for pivoting said panel into a second position wherein:

said panel has a length which is approximately equal to an approximately vertical length of said windshield;

said panel is generally horizontal when said panel is in said first position;

said panel is generally parallel with said front windshield when said panel is in said second position; and said outside surface always faces away from said interior, and said inside surface always faces toward said interior, when said pivot means pivots said panel between said first position and said second position.

2. The sunshield of claim 1, wherein said length of said panel is laterally horizontal when said panel is in said first position, and said length of said panel is approximately vertical when said panel is in said second position.

3. The sunshield of claim 2, wherein said outside surface faces toward a rood when said panel is in said first position, and said outside surface faces said windshield when said panel is in said second position.

4. The sunshield of claim 3, further comprising a sun visor pivotally attached to said panel.

5. The sunshield of claim 1, further comprising a sum visor pivotally attached to said panel.

6. The sunshield of claim 1, wherein said panel comprises a rigid frame, and a sheet of material attached to said frame.

7. The sunshield of claim 1, further comprising a sheet of material to at least partially cover said panel.

8. The sunshield of claim 1, further comprising a glareshield attachable to said panel.

* * * * *